United States Patent
Lewis

(10) Patent No.: US 9,577,422 B1
(45) Date of Patent: Feb. 21, 2017

(54) GROUND WIRE FAULT CIRCUIT INTERRUPTER

(71) Applicant: Dennis E. Lewis, Ware, MA (US)

(72) Inventor: Dennis E. Lewis, Ware, MA (US)

( * ) Notice: Subject to any disclaimer, the term of this patent is extended or adjusted under 35 U.S.C. 154(b) by 0 days.

(21) Appl. No.: 14/966,054

(22) Filed: Dec. 11, 2015

(51) Int. Cl.
*H02H 3/00* (2006.01)
*H02H 3/16* (2006.01)
*H02H 7/08* (2006.01)

(52) U.S. Cl.
CPC .............. *H02H 3/162* (2013.01); *H02H 7/08* (2013.01)

(58) Field of Classification Search
CPC ...... H02H 3/355; H02H 1/0015; H02H 3/338; H02H 3/335; H02H 3/33; H01H 83/04
USPC .. 361/1, 5, 8, 20, 22, 23, 36, 42, 43, 44, 45, 361/46, 47, 60, 63, 65, 90, 91.1, 92; 318/400.01, 700, 800, 400.21, 400.22, 318/400.26; 363/174, 175
See application file for complete search history.

(56) References Cited

U.S. PATENT DOCUMENTS

RE30,304 E * 6/1980 Eckart .................... H02H 3/347
361/44

* cited by examiner

*Primary Examiner* — Antony M Paul
(74) *Attorney, Agent, or Firm* — Grogan, Tuccillo & Vanderleeden, LLP

(57) ABSTRACT

A grounding wire fault circuit interrupter for an electrical machine includes a chassis ground wire, a sensor, and a logic circuit. The chassis ground wire is configured to be electronically connected to a structure of the electrical machine such that the structure of the electrical machine is further electrically connected to one or more power lines that provide electrical power to the electrical machine. The sensor is electronically connected to the chassis ground wire. The logic circuit is electronically connected to the sensor. The sensor is configured to detect current leaks within the electrical machine by sensing electrical power on the chassis ground wire, and the logic circuit is configured to interrupt the flow of electrical power to the electrical machine when the sensor detects a current leak.

17 Claims, 4 Drawing Sheets

GROUND WIRE FAULT CIRCUIT INTERRUPTER

FIELD

The present invention relates generally to ground fault circuit interrupters.

BACKGROUND OF THE INVENTION

Many modern electrical machines are powered by electrical power supply circuits. However, current leaks within a power supply circuit allow electrical current to leak out of the power supply circuit and flow along an unintended path. Leaked current can pool within the structure of an electrical machine and form an electrical charge. When a connection path is made between the structure and an electrical ground sump, hereinafter also referred to as "Earth Ground," the built up electrical charge is released/discharged as an electrical fault current which flows from the structure, through the connection path, and into the sump. Such fault currents are dangerous as they may damage sensitive electrical components. Moreover, when the connection path passes through an individual, a fault current may cause injuries such as blistering, burns and/or death.

In order to prevent fault current caused by current leaks, many electrical machines and convenience outlets are protected by devices, known as ground fault circuit interrupters ("GFCI"), which interrupt/"shut off" the electrical current of a power supply circuit after a current leak has been detected so that a charge cannot build up within the structure of an electrical machine. Traditional GFCIs detect current leaks by measuring the current leaving one side of a power source ("the hot wire") at a point just prior to entering the electrical machine and comparing it to the current measured on the return path ("grounded conductor") at a point just after the electrical machine. Differences between the measured currents indicate current leakage within the electrical machine. As such, traditional GFCIs may require that a protected electrical machine/system be connected to Earth Ground.

Accordingly, traditional GFCIs work well for electrical machines having one or more electrical motors that operate on the same power requirements in which the current flowing into the hot wire(s) of the electrical machine equals the electrical current flowing out of the grounded conductor(s) of the electrical machine. However, there exist many electrical machines which are configured such that they have two or more current carrying conductors and may not be connected to Earth Ground. Accordingly, such machines cannot be protected against fault currents by traditional GFCIs.

Further, there additionally exist machines, known as mixed load machines, which include two or more electrical motors having differing electrical power requirements/loads. For example, a mobile masonry saw may have a primary electrical motor that drives a cutting blade and operates on 240 volts alternating current ("VAC") and a secondary electrical motor that drives a cooling pump and operates on 120 VAC. In such mixed load electrical machines, it is often the case that the primary motor is powered via two 240 VAC hot wires, the secondary motor is powered by just one of the two 240 VAC hot wires, and the grounded conductor is connected to the secondary motor. Because current imbalances are likely to exist between the two 240 VAC hot wires, traditional GFCIs cannot accurately detect current leaks within the two or more electrical motors. Instead, mixed load electrical machines are often protected against current leaks via grounding wires attached to the structure of the mixed load electrical machine. Such grounding wires allow leaking current to drain away from the structure so that an electrical charge does not build up within the structure. However, grounding wires must be connected to Earth Ground in order to drain leaking current out the structure of a mixed load electrical machine. Accordingly, operators of mixed load electrical machines should verify that the grounding wire is actually grounded to Earth Ground prior to powering up the mixed load electrical machine. However, for various reasons, such as lack of training, time and/or testing equipment, many operators of mixed load electrical machines fail to do so. Additionally, a grounding wire that tested positive as being connected to Earth Ground prior to powering up a mixed load electrical machine may subsequently become compromised, without warning, such that it looses its connection to Earth Ground during operation of the mixed load electrical machine.

With the foregoing concerns in mind, it an object of the present invention to provide for an improved GFCI that is capable of detecting current leaks within an electrical machine that does not require a grounding wire. It is another object of the present invention to provide for an improved GFCI that can detect current leaks within mixed load electrical machines.

SUMMARY OF THE INVENTION

In an embodiment, a grounding wire fault circuit interrupter for an electrical machine is provided. The grounding wire fault circuit interrupter includes a chassis ground wire, a sensor, and a logic circuit. The chassis ground wire is configured to be electronically connected to a structure of the electrical machine such that the structure of the electrical machine is further electrically connected to one or more power lines that provide electrical power to the electrical machine. The sensor is electronically connected to the chassis ground wire. The logic circuit is electronically connected to the sensor. The sensor is configured to detect current leaks within the electrical machine by sensing electrical power on the chassis ground wire, and the logic circuit is configured to interrupt the flow of electrical power to the electrical machine when the sensor detects a current leak.

In another embodiment, a method for protecting an electrical machine from fault currents is provided. The method includes inserting a grounding wire fault circuit interrupter into an electrical power circuit having one or more power lines that provide electrical power to the electrical machine. The one or more power lines are electronically connected to a structure of the electrical machine. The grounding wire fault circuit interrupter has a chassis ground wire, a sensor, and a logic circuit. The chassis ground wire is electronically connected to the sensor and to the structure of the electrical machine. The sensor is electronically connected to the chassis ground wire. The logic circuit is electronically connected to the sensor and configured to interrupt the flow of electrical power to the electrical machine. The method further includes detecting a current leak within the electrical machine by sensing electrical power on the chassis ground wire via the sensor. The method further includes interrupting the flow of electrical power to the electrical machine via the logic circuit when the sensor detects the current leak.

In yet another embodiment, an electrical machine including at least one or more electrical loads and an integrated grounding wire fault circuit interrupter is provided. The one or more electrical loads receive electrical power from two or more conductors. The integrated grounding wire fault circuit interrupter includes a chassis ground wire, a sensor, and logic circuit. The chassis ground wire is configured to be electronically connected to a structure of the electrical machine such that the structure of the electrical machine is further electrically connected to one or more of the two or more conductors that provide electrical power to the one or more electrical loads. The sensor is electronically connected to the chassis ground wire. The logic circuit is electronically connected to the sensor. The sensor is configured to detect current leaks within the electrical machine by sensing electrical power on the chassis ground wire, and the logic circuit is configured to interrupt the flow of electrical power to the one or more electrical loads when the sensor detects a current leak.

DETAILED DESCRIPTION OF THE INVENTION

Figure 1:
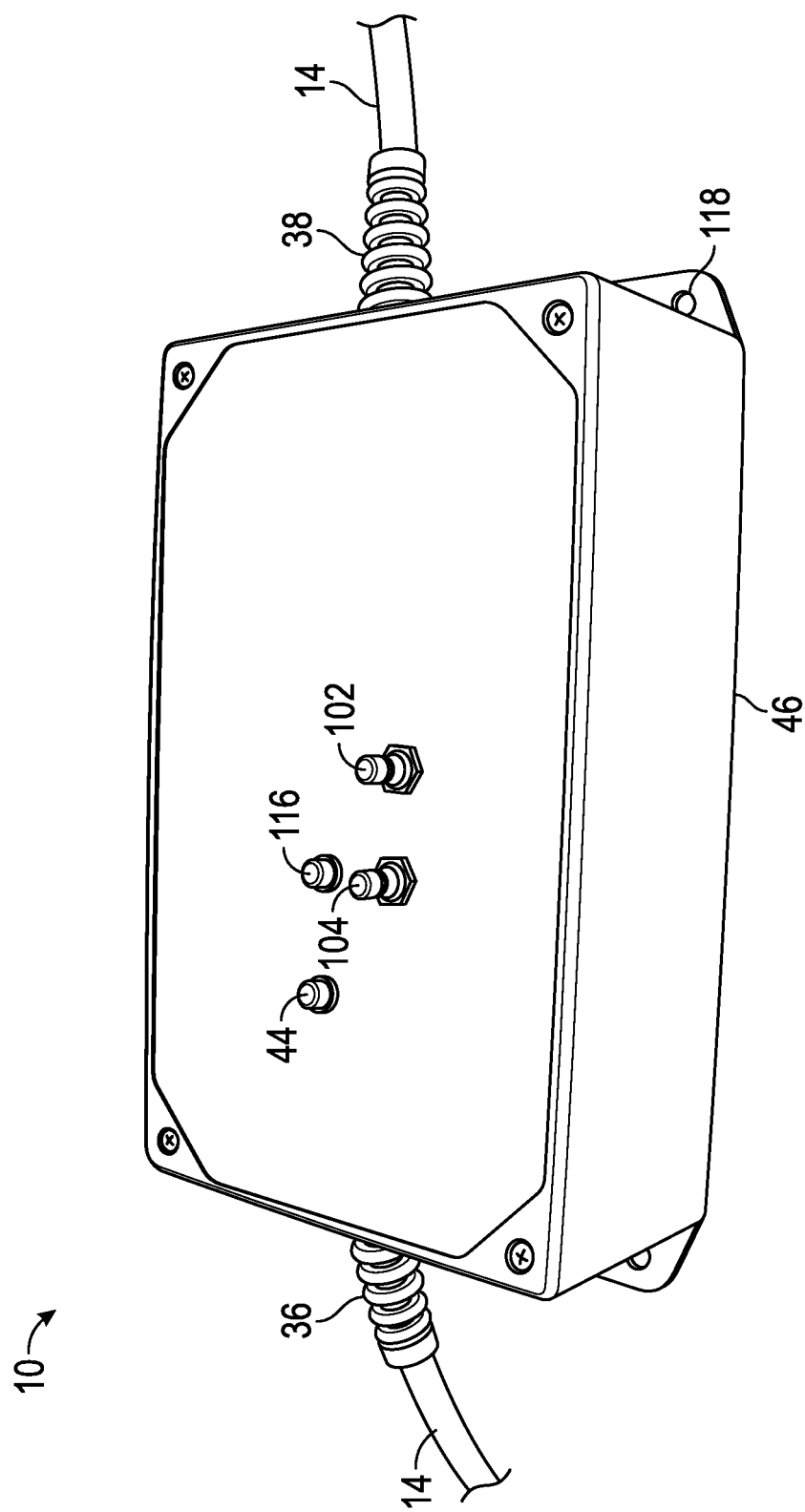
FIG. 1 is a perspective view of a ground wire fault circuit interrupter ("GWFCI") according to an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled", "electrically connected" and "electrical communication" means that the referenced elements are directly or indirectly connected such that an electrical current may flow from one to the other. Such connections may include a direct conductive connection (i.e., without an intervening capacitive, inductive or active element), an inductive connection, a capacitive connection, and/or any other suitable electrical connection. Intervening components may be present. As will be appreciated, the terms "electrical current", "electrical power", "electrical flow", "power" and/or other similar terms are used herein to refer to the flow of electrons through one or more conducting wires, sensors, lights, motors, power transformers and/or other similar electrical devices. The term "electrical load" means a device or apparatus that consumes electrical power. Additionally, the abbreviations "VAC" and "VDC" refers to "volts alternating current" and "volts direct current", respectively.

Figure 2:
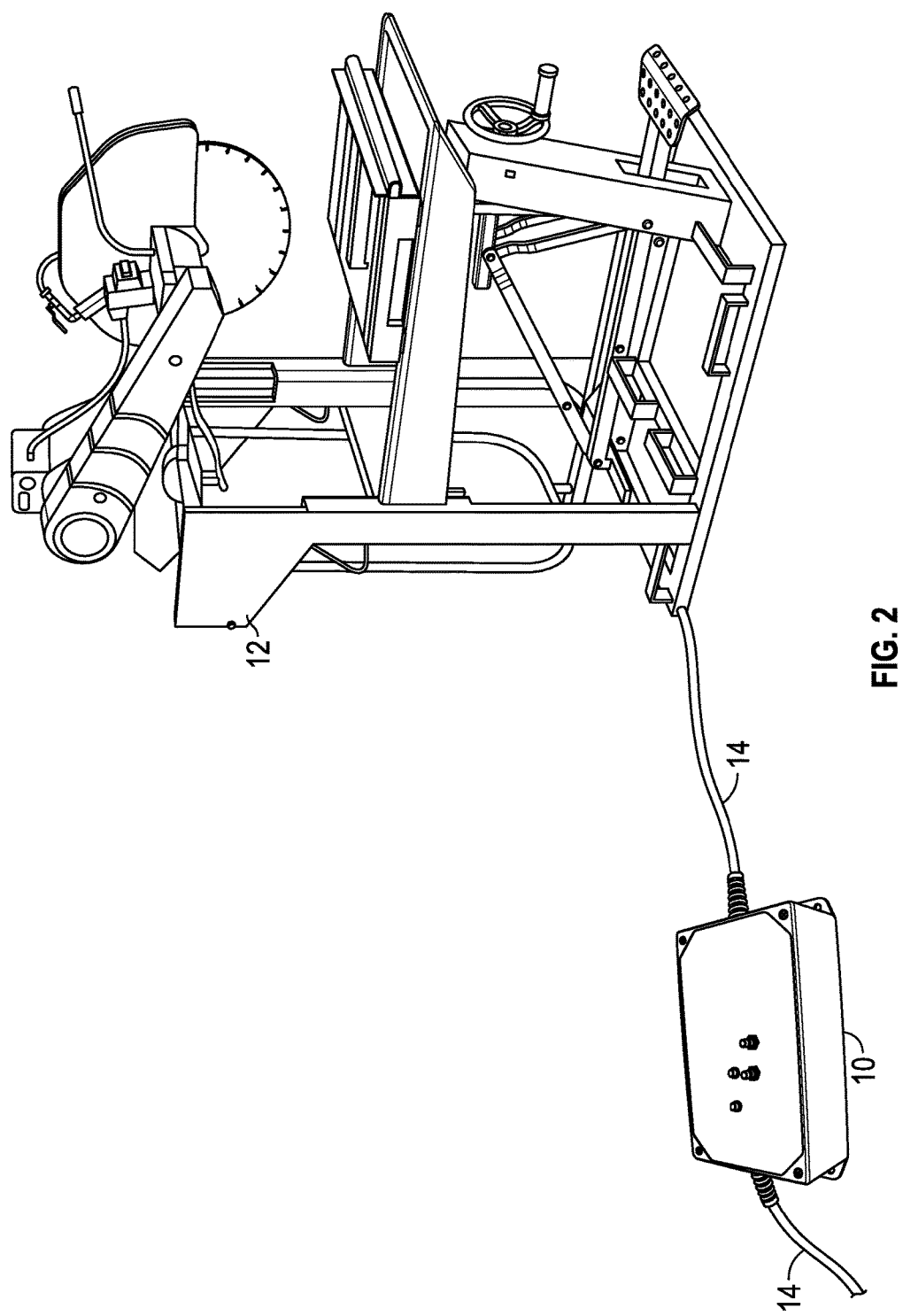
FIG. 2 is another perspective view of the GWFCI of FIG. 1, wherein the GWFCI is inserted into a power circuit of an electrical machine that includes two or more electrical motors having differing power requirements.

Referring to FIGS. 1 and 2, a ground wire fault circuit interrupter ("GWFCI") 10 for an electrical machine 12 according to an embodiment is shown. The GWFCI 10 is configured to be inserted into an electrical power circuit 14 that powers an electrical machine 12 such that the GWFCI 10 can toggle (close/interrupt) the flow of electrical power to the electrical machine 12. The GWFCI 10 is further configured to detect current leaks within the electrical machine 12 and may be further configured to interrupt power to the electrical machine 12 upon detecting a current leak. The electrical machine 12 may be configured such that it does not have a grounding wire and/or may be a mixed load electrical machine.

Figure 3:
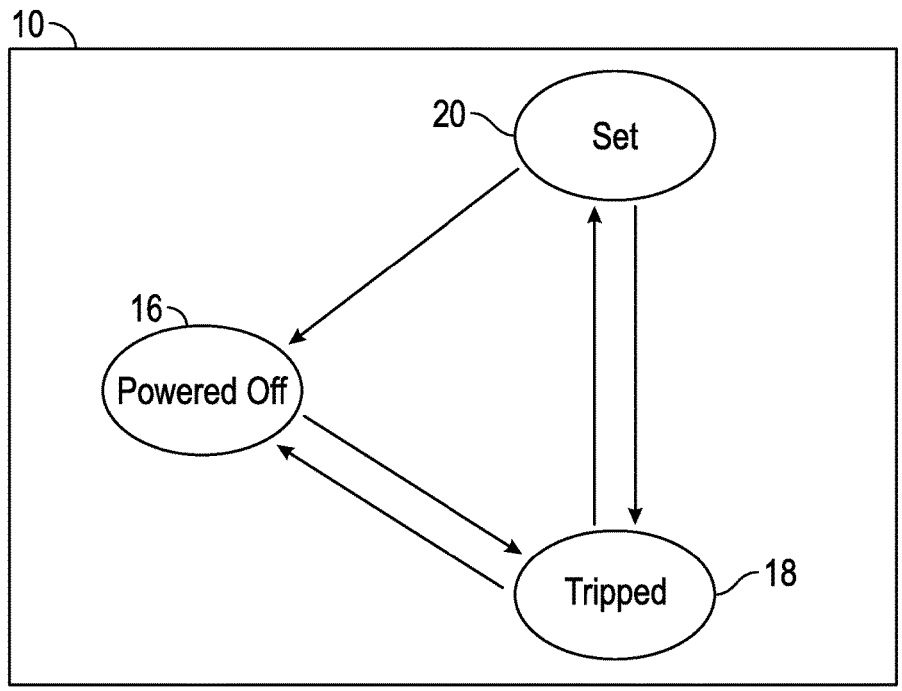
FIG. 3 is a state diagram of the GWFCI of FIG. 1 according to an embodiment of the present invention.

As illustrated in FIG. 3, the GWFCI 10 may be further configured to have one or more states to include: POWERED OFF 16; TRIPPED 18; and SET 20. When the GWFCI 10 is in the POWERED OFF state 16, electrical current does not flow into the GWFCI 10. When the GWFCI 10 is in the TRIPPED state 18, electrical current may flow into the GWFCI 10 but is restricted from flowing to the electrical machine 12. When the GWFCI 10 is in the SET state 20, electrical current may flow into the GWFCI 10 and further flow out of the GWFCI 10 and into the electrical machine 12.

Figure 4:
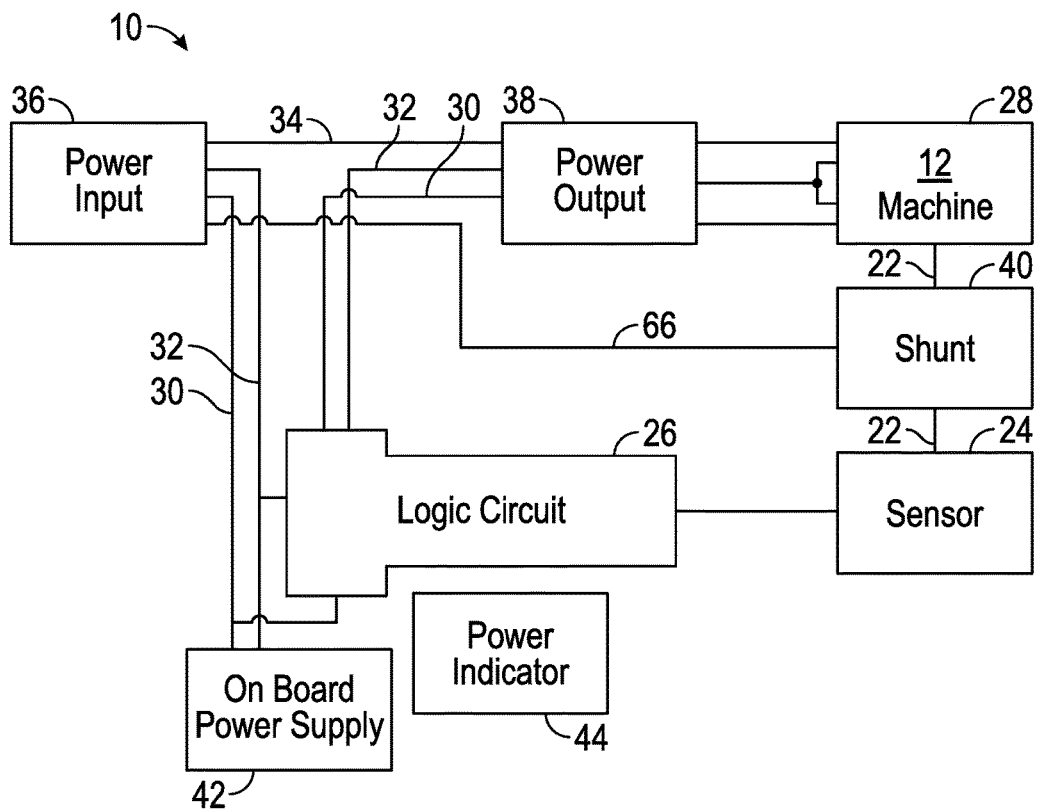
FIG. 4 is a block diagram illustrating the components of the GWFCI of FIG. 1 according to an embodiment of the present invention.

Referring to FIGS. 1 and 4, the GWFCI 10 includes a chassis ground wire 22, a sensor 24 and a logic circuit 26. The chassis ground wire 22 is electronically connected to a structure 28 of the electrical machine 12 and to the sensor 24. The electrical power circuit 14 may have one or more power lines 30, 32, 34 that provide electrical power to the electrical machine 12 and are electronically connected/grounded to the structure 28 of the electrical machine 12. The sensor 24 detects current leaks within the electrical machine 12 by sensing electrical power on the chassis ground wire 22. The logic circuit 26 interrupts the flow of electrical power to the electrical machine 12 when the sensor 24 detects a current leak. The GWFCI 10 may further include a power input 36, a power output 38, a shunt 40, an onboard power supply 42 and/or a power indicator 44. The GWFCI 10 may further include a body 46 that houses the chassis ground wire 22, sensor 24, logic circuit 26, power input 36, power output 38, shunt 40, onboard power supply 42, and power indicator 44 and/or other components of the GWFCI 10.

Figure 5:
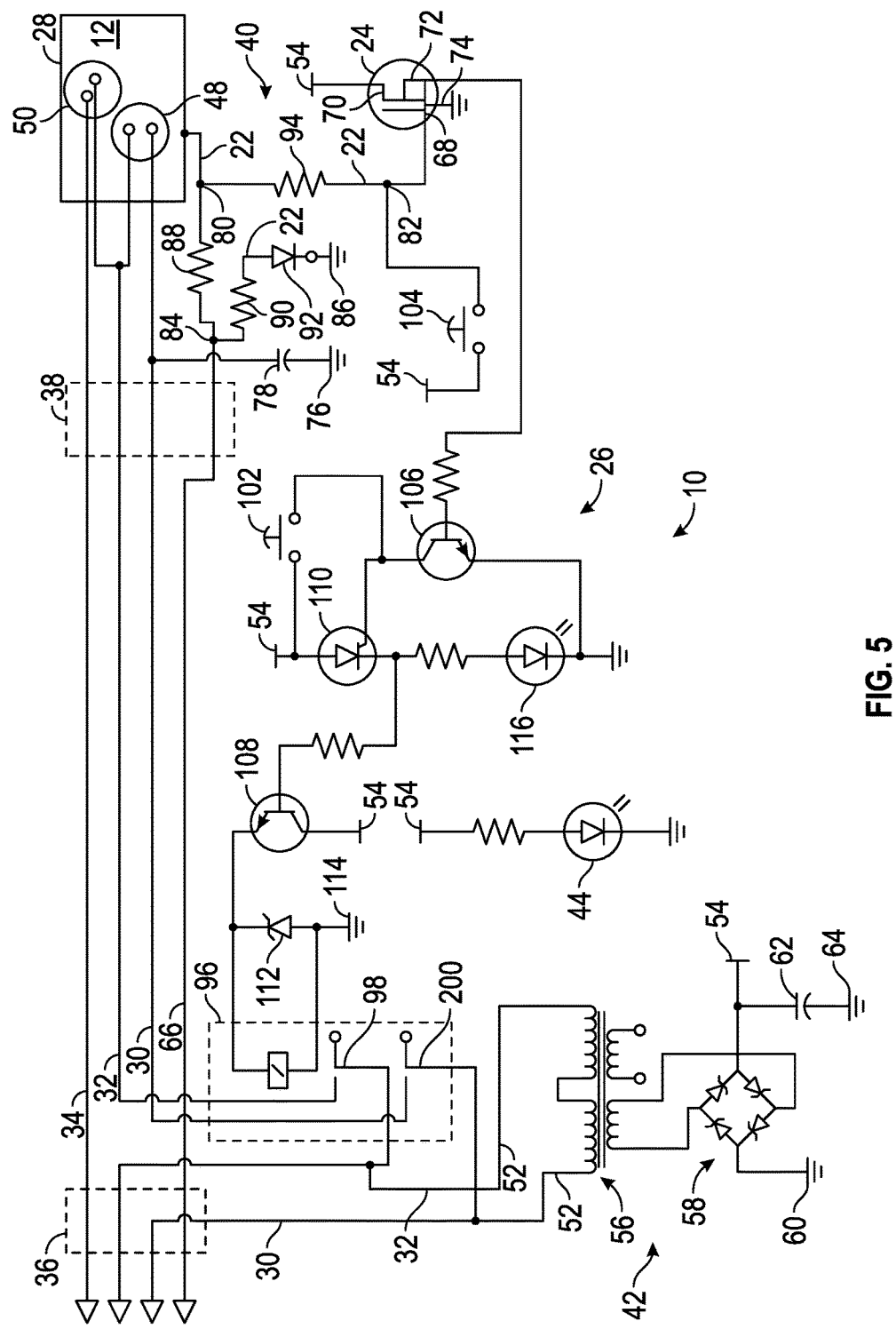
FIG. 5 is a circuit diagram of the of the GWFCI of FIG. 1 according to an embodiment of the present invention.

Referring now to FIGS. 4 and 5, the one or more power lines 30, 32, 34 may be electronically connected to the GFWCI 10. For example, in embodiments, the power lines 30, 32, 34 may be electronically connected to the GWFCI 10 such that they pass through the GWFCI 10 via the power input 36 and the power output 38. The power lines 30, 32, 34 may include one or more hot lines 30, 32 also known as conductors, and one or more return lines 34, also known as grounded conductors. The power lines 30, 32, 34 may be further electronically connected to the onboard power supply 42. In embodiments, the power lines 30, 32, 34 may be further electronically connected to the logic circuit 26 such that the logic circuit 26 can toggle (allow/interrupt) the flow of electrical current from the power lies 30, 32, 34 to the electrical machine 12. As will be appreciated, the power lines 30, 32, 34 may be electronically connected to the onboard power supply 42 such that the onboard power supply 42 continues to receive electrical power even when the logic circuit 26 interrupts the flow of electrical current to the electrical machine 12.

In embodiments, the hot wires 30, 32 may be electronically connected to the onboard power supply 42, the logic circuit 26, and the electrical machine 12, while the grounded conductors 34, may be electronically connected to the electrical machine 12.

As shown in FIG. 5, the electrical machine 12 may be a mixed load electrical machine having a first electrical load/ motor 48 and a second electrical load/motor 50. The first motor 48 may operate on 240 VAC and the second motor 50 may operate on 120 VAC. Accordingly, two hot wires 30, 32 may be electronically connected to the first motor 48, with one hot wire 32 being further electronically connected to the second motor 50, and the grounded conductor 34 being electronically connected to the second motor 50. While the embodiments shown in FIGS. 4 and 5 depict power lines 30, 32, 34 configured to transport 240 VAC, other embodiments may include power lines configured to transport 120 VAC and/or any other electrical standard for operating electrical motors or other equipment. Additionally, while the embodiment shown in FIG. 5 depicts the first 48 and second 50 electrical loads/motors as electrical motors, the first 48 and second 50 electrical loads may be other types of electrical loads.

As will be appreciated, various components of the GWFCI 10 may require transformed/conditioned electrical power, herein after also referred to as "conditioned power" and/or "conditioned current", in order to operate. As such, the GWFCI 10 may receive conditioned power from an external source and/or the onboard power supply 42. The onboard power supply 42 has a front side 52 and a back side 54 and is configured to convert/transform/condition the electrical current, received at the front side 52 from the power lines 30, 32, 34 into a conditioned current which is distributed throughout the GWFCI 10 via the back side 54. The conditioned current is of an appropriate form to power the sensor 24 and the logic circuit 26. For example, the onboard power supply 42 may convert 240 VAC into 12 VDC. As another example, the onboard power supply 42 may be a switching power supply that can convert a front side 52 voltage in the range of 90 to 275 VAC into the conditioned current. In embodiments, the onboard power supply 42 may include a transformer 56 and a full wave bridge rectifier 58. The rectifier 58 may be grounded to the chassis/structure 28 of the electrical machine 12 as shown by reference numeral 60. Further, a capacitor 62 may be inserted between the rectifier 58 and a chassis grounding connection 64. The capacitor 62 may be polarized and 1000 of 50 v. In embodiments, the onboard power supply 42 may be a switching power supply that may convert.

The chassis ground wire 22 is electrically connected to the structure/chassis 28 of the electrical machine 12 and is configured to conduct current leaking within the electrical machine 12. In embodiments, the chassis ground wire 22 may be further electronically connected to a grounding wire 66. The grounding wire 66 may be configured to connect to an Earth Ground terminal so that current leaking within the electrical machine is prevented from building up within the electrical machine 12.

The sensor 24 is electronically connected to the chassis ground wire 22 and is configured to detect current leaks within the electrical machine 12 by sensing electrical current and/or voltage within the chassis ground wire 22. Upon detecting a current leak, the sensor 24 sends a signal to the logic circuit 26. The sensor 24 may be further electronically connected to the logic circuit 26 and/or the back side 54 of the onboard power supply 42. In such embodiments, the sensor 24 may signal the logic circuit 26 by allowing conditioned power to flow from the back side 54 to the logic circuit 26. For example, the sensor 24 may be configured such that when the sensor 24 dose not sense electrical current and/or voltage within the chassis ground wire 22, the sensor 24 restricts the conditioned current from flowing from the back side 54 through the sensor 24 and into the logic circuit 26; and when the sensor 24 senses electrical current and/or voltage within the chassis ground wire 22, the sensor allows the conditioned current to flow from the back side 54 through the sensor 24 and into the logic circuit 26. In embodiments, the sensor 24 may be able to detect a current within the chassis ground wire 22 as low as 3.5 mA. In such embodiments, the electrical current flowing through the power lines 30, 32, 34 may be 120 VAC.

As shown in FIG. 5, the sensor may a N-Channel MOSFET having a first pin 68 electrically connected to the chassis ground wire 22, a second pin 70 electrically connected to the back side 54 of the power supply 42, and a third pin 72 electronically connected to the logic circuit 26 such that when the N-Channel MOSFET does not detect current and/or voltage at the first pin 68, the transformed current cannot flow from the second 70 pin to the third 72 pin; and when the N-Channel MOSFET does detect current and/or voltage at the first pin 68, the transformed current is able to flow from the second pin 70 to the third pin 72. The resolution/sensitivity of the sensor 24 may be increased by coupling one of the hot lines 30 to the chassis ground 28 as shown by reference numeral 76. A capacitor 78 may be located between the hot line 30 and the chassis grounding 76. In embodiments, the capacitor 78 may be non-polarized and 0.12 uF and 250 V. The capacitor 78 couples the hot line 30 to the chassis ground 28 so that the sensor "sees"/senses a voltage on the chassis ground wire 22.

The shunt 40 includes three terminals 80, 82, 84 and is configured to protect the sensor 24 and/or the logic circuit 26 from high voltages. Terminals 80 and 82 are electronically connected to the chassis ground wire 22 such that the chassis ground wire 22 enters the shunt 40 at terminal 80, and exits the shunt 40 at terminal 82 which electronically connects the sensor 24 to the chassis ground wire 22. Within the shunt 40, the chassis ground wire 22 electronically connects terminal 80 to terminal 82 and terminal 80 to terminal 84. The ground chassis wire 22 may also be electronically connected to the grounding wire 66 via terminal 84. As shown by reference numeral 86, terminal 84 may further electronically connect the ground chassis wire 22 to the chassis/structure 28 of the electronic machine 12. A resistor 88 may be inserted in the chassis ground wire 22 between terminals 80 and 84. The resistor 88 may be 0.03 ohm. A resistor 90 may also be inserted in the ground chassis wire 22 between terminal 84 and the chassis grounding 86. The resistor 90 may be 1 k. A diode 92 may also be inserted in the chassis ground wire 22 between the resistor 90 and the chassis grounding 86. A resistor 94 may be inserted within the chassis grounding wire 22 between terminals 80 and 82.

As stated above, the logic circuit 26 is electronically connected to the sensor 24 and is configured to toggle (close/interrupt) the flow of electrical current from the power lines 30, 32, 34 to the electrical machine 12 upon detection of a current leak within the electrical machine 12 by the sensor 24. The logic circuit 26 may toggle (allow/interrupt) the flow of electrical current from the power lines 30, 32, 34 to the electrical machine 12 via an electromechanical relay 96. In embodiments the relay 96 may be a solenoid powered by conditioned current received from the back side 54 of the onboard power supply 42. The relay 96 may have one or more gates 98, 200 which are open when the logic circuit 26 interrupts the hot lines 30, 32 and closed when the logic circuit 26 closes the hot lines 30, 32. While the embodiments disclosed herein include an electromechanical relay 96 that interrupts the flow of electrical power to the electrical machine 12 via opening gates 98 and 200, it is to be understood that the electromechanical relay 96 could be configured such that the flow of electrical power to the electrical machine 12 is interrupted by closing gates 98 and 200. It should be further understood that the logic circuit 26 may use means other than an electromechanical mechanical relay to toggle the flow of electrical current through the power lines 30, 32, 34.

The logic circuit 26 may additionally include a set input control 102 and a test input control 104. The set input control 102 is configured to place the GWFCI 10 into the SET state (20 in FIG. 3). The test input control 104 is configured to transition the GWFCI 10 from the SET state 20 to the TRIPPED state (18 in FIG. 3) by simulating a current leak.

As shown in FIG. 5, the logic circuit 26 may include one or more transistors 106, 108 a silicon-controlled rectifier ("SCR") 110 and a diode 112. Transistor 106 is electronically connected to the sensor 24, SCR 110 and the set input control 102. The SCR 110 may be electronically connected to the back side 54 of the onboard power supply 42. The SCR 110 is further connected to transistor 108. Transistor 108 is electronically connected to the relay 96. The diode 112 is electronically connected to the relay 96, transistor 108 and a chassis 28 grounding 114. The logic circuit 26 may further include a set indicator 116 that indicates whether or not the GWFCI 10 is in the SET state 20. In embodiments, the set indicator 116 may be a LED. The test input control 104 may be electronically connected to the sensor 24 and back side 54 of the power relay 42.

The power indicator 44 is configured to indicate when electrical current/power is flowing into the GWFCI 10. For example, as further shown in FIG. 4, the power indicator 44 may be a LED electronically connected to the back side 54 of the onboard power supply 42.

As illustrated in FIG. 4, the power input 36 is configured to receive electrical current from an external electrical power source (not shown) and electrically connects the GWFCI 10 to the power lines 30, 32, 34. The power input 36 may be take the form of one or more wires with male or female electrical connectors clamped, crimped, soldered, and/or welded onto one or more ends of the power lines 30, 32, 34 or any other suitable form of electrical connector. For example, in embodiments, the power input 36 may be a standard 120 VAC or 240 VAC plug or socket.

The power output 38 electrically connects the GWFCI 10 to the power lines 30, 32, 34 and is configured to allow electrical current to flow out of the GWFCI 10 and into the electrical machine 12. The power output 38 may take the form of one or more wires with male or female electrical connectors clamped, crimped, soldered, and/or welded onto one or more ends of the power lines 30, 32, 34 or any other suitable form of electrical connector. For example, in embodiments, the power output 38 may be a standard 120 VAC or 240 VAC plug or socket.

Referring back to FIGS. 1 and 2, the body 46 may be made from plastic, metal, composite, rubber, wood or any other material suitable to house electronic circuitry. The body 46 may be penetrated by the power input 36 and/or the power output 38. In embodiments, the body 46 may expose one or more indicator lights 44, 116 and/or input controls 102, 104 of the GWFCI 10. The body 46 may further include one or more fasteners 118 for mounting the body 46 to the electrical machine 12. While embodiments of the GWFCI 10 having a body 46 may be mounted to an electrical machine 12, it is to be understood that other embodiments of the GWFCI 10 may be fully or partially integrated into the electrical machine 12. For example, various elements of the GWFCI 10 may be integrated into the electrical machine 12 such that the GWFCI 10 and the electrical machine 12 share one or more components (e.g., circuit boards, soldering, electrical pins, etc.). In yet other embodiments, the GWFCI 10 may be a separate device apart from the electrical machine 12 and not mounted to the electrical machine 12.

Referring now to FIGS. 3 and 5, in operation, according to an embodiment, the GWFCI 10 begins in the POWERED OFF state 16 with no electrical power flowing into the power input 36. Accordingly, the power indicator 44 indicates that no electrical power is reaching the GWFCI 10 (e.g., the power indicating LED is unlit). Additionally, the set indicator 116 indicates that the GWFCI 10 is not in the set state (e.g., the set indicator LED is unlit). While in the POWERED OFF state 16, the mechanical relay 96 may be in an open position such that the gates 98 and 200 are configured to interrupt the flow of any electrical power that may enter the GWFCI 10 to the electrical machine 12.

Electrical power from an external electrical power source may then be introduced to the GWFCI 10 via the power input 36. The GWFCI 10 then transitions from the POWERED OFF state 16 to the TRIPPED state 18. Accordingly, the power input 36 distributes electrical power to the onboard power supply 42 and the power indicator 44 indicates electrical power is reaching the GWFCI 10 (e.g., the power indicating LED is lit). However, the set indicator 116 continues to indicate that the GWFCI 10 is not in the SET state 20 (e.g., the set indicator LED remains unlit). The onboard power supply 42 then begins to convert the received electrical power into the conditioned power which is distributed via the backside 54 of the onboard power supply 42. However, the mechanical relay 96 continues to remain open such that no electrical power reaches the electrical machine 12.

The GWFCI 10 may then be transitioned from the TRIPPED state 18 to the SET state 20 by activating the set input control 102. For example, as shown in FIG. 5, activating the set input control 102 causes the SCR 110, via the transformed current received from the back side 54 of the onboard power supply 42, to activate transistor 108 which in turn activates the electromechanical relay 96 thereby causing the electromechanical to close. While in the SET state 20, the SCR 110 remains activated such that transistor 108 keeps the mechanical relay 96 closed. When the mechanical relay 96 is closed, electrical power is able to flow to the electrical machine 12 via the hot lines 30 and 32. Additionally, conditioned current is able to flow to the set indicator 116 which then indicates that the GWFCI 10 is in the SET state 20 (e.g., the LED becomes lit).

While in the SET state 20, electrical current/voltage that leaks into the structure 28 of the electrical machine 12 is sensed by the sensor 24 via the chassis ground wire 22. The sensor 24 then sends a signal to the logic circuit 26 indicating that a current leak has been detected within the electrical machine 12. The logic circuit 26 than transitions the GWFCI 10 from the SET state 20 to the TRIPPED state 18 by opening the mechanical relay 96 thereby interrupting the flow of electrical power to the electrical machine 12. The set indicator 116 then indicates that the GWFCI 10 is no longer in the SET state 20 (e.g., the set indicator LED is unlit).

For example, in the embodiment shown in FIG. 5, electrical current and/or voltage flowing in/building on the chassis ground wire 22 activates the N-Channel MOSFET 24 which allows transformed current from the back side 54 of the onboard power supply 42 to activate transistor 106. When transistor 106 is activated, the SCR 110 is deactivated/released which in turn deactivates transistor 108. When transistor 108 deactivates, the mechanical relay 96 is opened and the flow of electrical power to the electrical machine 12 is interrupted.

As will be appreciated, the test input control 104 allows a user to test the ability of the GWFCI 10 to protect the electrical machine 12 against fault currents. For example, in embodiments, when the GWFCI 10 is in the SET state 20, activating the test input control 104 causes the logic circuit 26 to simulate a detected current leak within the electrical machine 12 which transitions the GWFCI 10 to the TRIPPED state 18. For example, as shown in FIG. 5, activating the test input control 104 allows transformed current received from the back side 54 of the onboard power supply 42 to flow into the chassis ground wire 22 thereby simulating the buildup of electrical power within the structure 28 of the electrical machine 12. This in turn causes the sensor 24 to send a signal to the logic circuit 26 indicating that a current leak has been detected within the electrical machine 12. The logic circuit 26 then interrupts the flow of electrical current to the electrical machine 12 in the manner discussed above.

When the external electrical power is disconnected from the power input 36 of the GWFCI 10, the GWFCI 10 transitions to the POWERED OFF state 16.

As is to be understood, the GWFCI 10 may include one or more resistors and/or capacitors to protect various electrical components of the GWFCI 10 from power surges and/or to condition the electrical current flowing through the GWFCI 10.

It is to be further understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

As disclosed herein, embodiments of the GWFCI 10 in accordance with the present invention advantageously protect an electrical machine 12 against fault current leakage by interrupting the flow of electrical power to the electrical machine 12 after detecting current leaking into the structure/chassis of the electrical machine 12. In particular, electrically connecting the chassis ground wire 22 to the structure 28 of the electrical machine 12 and to the sensor 24, and electronically connecting the one or more power lines 30, 32, 34 to the structure 28, allows the GWFCI 10 to detect fault current leaks within the electrical machine 12 by sensing leaking current and/or voltage in the chassis ground wire 22 even though the electrical machine 12 may lack a grounding wire, or where the electrical machine 12 has a grounding wire not actually connected to a grounding source (e.g., a bad/faulty connection to Earth Ground). Thus, unlike the prior art systems, which detect fault current leaks by comparing the current between two hot wires of an electrical power circuit and require a grounding wire having a good connection to Earth Ground, the GWFCI 10 of the present invention can prevent electrical surges on mixed load electrical machines as well as electrical machines that are configured to operate without a grounding wire. Thus, users of electrical machines, and in particular users of mobile electrical machines, need not verify that a grounding wire is connected to an Earth Grounding sump.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A grounding wire fault circuit interrupter for an electrical machine comprising:
   a chassis ground wire configured to be electronically connected to a structure of the electrical machine such that the structure of the electrical machine is further electrically connected to one or more power lines that provide electrical power to the electrical machine;
   an N-Channel MOSFET electronically connected to the chassis ground wire;
   a logic circuit electronically connected to the N-Channel MOSFET,
   a shunt configured to protect at least one of the N-Channel MOSFET and the logic circuit from high voltages; and
   wherein the N-Channel MOSFET is configured to detect current leaks within the electrical machine by sensing electrical power on the chassis ground wire, and
   the logic circuit is configured to interrupt the flow of electrical power to the electrical machine when the N-Channel MOSFET detects a current leak.

2. The grounding wire fault circuit interrupter of claim 1, wherein the logic circuit interrupts the flow of electrical power to the electrical machine via an electromechanical relay electrically connected to the one or more power lines.

3. The grounding wire fault circuit interrupter of claim 1, wherein the grounding wire fault circuit interrupter is configured to have at least one of a POWERED OFF state, a TRIPPED state, and a SET state;
   wherein when the grounding wire fault circuit interrupter is in the POWERED OFF state, electrical current does not flow into the grounding wire fault circuit interrupter;
   wherein, when the grounding wire fault circuit interrupter is in the TRIPPED state, electrical current flows into the grounding wire fault circuit interrupter but is restricted from flowing into the electrical machine; and
   wherein when the grounding wire fault circuit interrupter is in the SET state, electrical power flows into the grounding wire fault circuit interrupter and further flows into the electrical machine.

4. The grounding wire fault circuit interrupter of claim 3, wherein the logic circuit comprises:
   at least one of a set input control and a test input control;
   wherein the set input control is configured to transition the grounding wire fault circuit interrupter from the TRIPPED state to the SET state; and
   wherein the test input control is configured to transition the grounding wire fault circuit interrupter from the SET state to the TRIPPED state by simulating a current leak within the electrical machine.

5. The grounding wire fault circuit interrupter of claim 1, wherein the grounding wire fault circuit interrupter is mountable to the electrical machine.

6. The grounding wire fault circuit interrupter of claim 1, wherein the electrical machine is a mixed load electrical machine.

7. A method for protecting an electrical machine from fault currents, the method comprising:
   inserting a grounding wire fault circuit interrupter into an electrical power circuit having one or more power lines that provide electrical power to the electrical machine and are electronically connected to a structure of the electrical machine, the grounding wire fault circuit interrupter having a chassis ground wire electronically connected to an N-Channel MOSFET and to the structure of the electrical machine, a logic circuit electronically connected to the N-Channel MOSFET and configured to interrupt the flow of electrical power to the electrical machine, and a shunt configured to protect at least one of the N-Channel MOSFET and the logic circuit from high voltages;
   detecting a current leak within the electrical machine by sensing electrical power on the chassis ground wire via the N-Channel MOSFET; and
   interrupting the flow of electrical power to the electrical machine via the logic circuit when the N-Channel MOSFET detects the current leak.

8. The method of claim 7, wherein interrupting the flow of electrical power to the electrical machine via the logic circuit when the N-Channel MOSFET detects the current leak comprises:
   activating an electromechanical relay.

9. The method of claim 7, further comprising:
   transitioning the grounding wire fault circuit interrupter between at least one of a POWERED OFF state, a TRIPPED state, and a SET state;
   wherein when the grounding wire fault circuit interrupter is in the POWERED OFF state, electrical current does not flow into the grounding wire fault circuit interrupter;
   wherein, when the grounding wire fault circuit interrupter is in the TRIPPED state, electrical current flows into the grounding wire fault circuit interrupter but is restricted from flowing into the electrical machine; and
   wherein when the grounding wire fault circuit interrupter is in the SET state, electrical power flows into the grounding wire fault circuit interrupter and further flows into the electrical machine.

10. The method of claim 9, wherein the logic circuit comprises:
    at least one of a set input control and a test input control;
    wherein the set input control is configured to transition the grounding wire fault circuit interrupter from the TRIPPED state to the SET state; and
    wherein the test input control is configured to transition the grounding wire fault circuit interrupter from the SET state to the TRIPPED state by simulating a current leak within the electrical machine.

11. The method of claim 9, the method further comprising:
    testing the grounding wire fault circuit interrupter by simulating a current leak within the electrical machine.

12. The method of claim 7, further comprising:
    mounting the grounding wire fault circuit interrupter to the electrical machine.

13. The method of claim 7, wherein the electrical machine is a mixed load machine.

14. An electrical machine comprising:
    at least one or more electrical loads that receive electrical power from two or more conductors; and
    an integrated grounding wire fault circuit interrupter comprising:
       a chassis ground wire configured to be electronically connected to a structure of the electrical machine such that the structure of the electrical machine is further electrically connected to one or more of the two or more conductors that provide electrical power to the one or more electrical loads;
       an N-Channel MOSFET electronically connected to the chassis ground wire;
       a logic circuit electronically connected to the N-Channel MOSFET;
       a shunt configured to protect at least one of the N-Channel MOSFET and the logic circuit from high voltages; and
       wherein the N-Channel MOSFET is configured to detect current leaks within the electrical machine by sensing electrical power on the chassis ground wire, and the logic circuit is configured to interrupt the flow of electrical power to the one or more electrical loads when the N-Channel MOSFET detects a current leak.

15. The electrical machine of claim 14, wherein the logic circuit interrupts the flow of electrical power to the one or more electrical loads via an electromechanical relay electrically connected to the two or more conductors.

16. The electrical machine of claim 14, wherein the integrated grounding wire fault circuit interrupter is configured to have at least one of a POWERED OFF state, a TRIPPED state, and a SET state;

wherein when the integrated grounding wire fault circuit interrupter is in the POWERED OFF state, electrical current does not flow into the integrated grounding wire fault circuit interrupter;

wherein, when the integrated grounding wire fault circuit interrupter is in the TRIPPED state, electrical current flows into the integrated grounding wire fault circuit interrupter but is restricted from flowing into the one or more electrical loads; and wherein when the integrated grounding wire fault circuit interrupter is in the SET state, electrical power flows into the integrated grounding wire fault circuit interrupter and further flows into the one or more electrical loads.

17. The electrical machine of claim 16, wherein the logic circuit comprises:

at least one of a set input control and a test input control;

wherein the set input control is configured to transition the integrated grounding wire fault circuit interrupter from the TRIPPED state to the SET state; and wherein the test input control is configured to transition the integrated grounding wire fault circuit interrupter from the SET state to the TRIPPED state by simulating a current leak within the electrical machine.

* * * * *